May 20, 1924.
J. BRANDSTETTER
METHOD OF MANUFACTURING BOLTS
Filed March 1, 1922
1,494,660
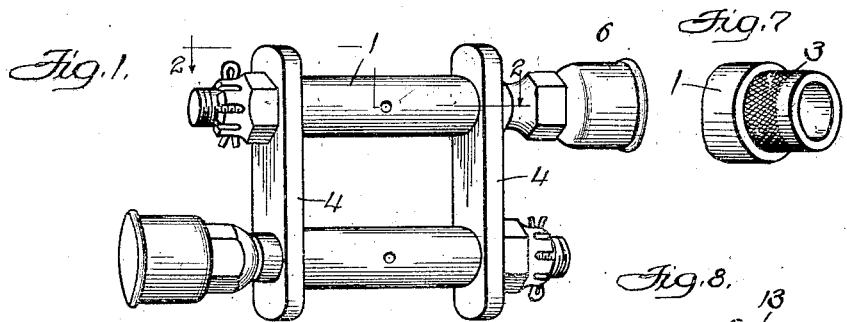
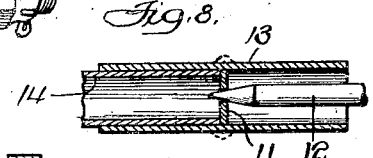
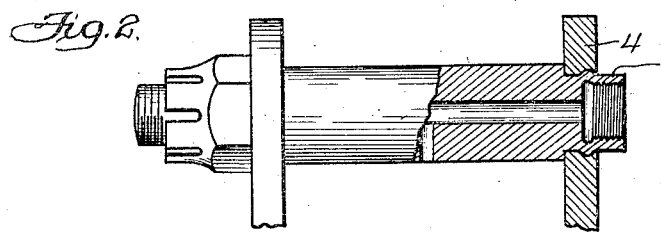
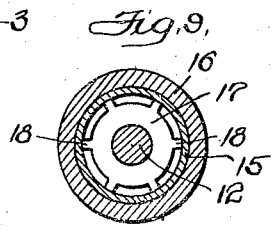
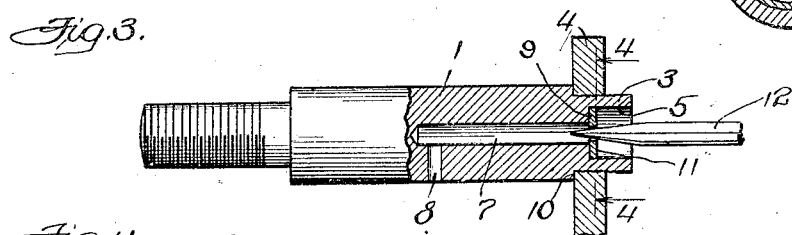
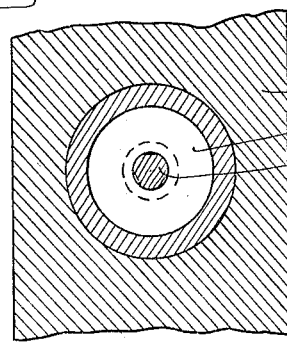
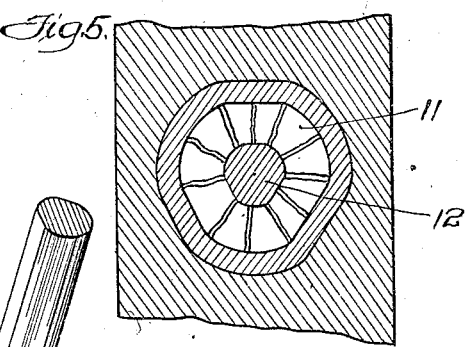
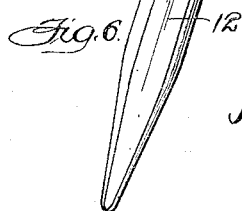
Witness:
W. K. Olson
Inventor:
Josef Brandstetter
by Albert Scheible, Atty.

Patented May 20, 1924.

1,494,660

UNITED STATES PATENT OFFICE.

JOSEF BRANDSTETTER, OF CHICAGO, ILLINOIS.

METHOD OF MANUFACTURING BOLTS.

Application filed March 1, 1922. Serial No. 540,176.

*To all whom it may concern:*

Be it known that I, JOSEF BRANDSTETTER, a citizen of the United States, residing at Chicago, in the county of Cook and State of Illinois, have invented certain new and useful Improvements in Methods of Manufacturing Bolts; and I do hereby declare the following to be a full, clear, and exact description of the invention, such as will enable others skilled in the art to which it appertains to make and use the same.

My invention relates to bolts and the like, and the methods of manufacturing the same, and in one aspect relates to a novel provision upon the shank of a bolt for interlocking this shank with adjacent stock against movement both longitudinally of the shank of the bolt and rotationally about the axis of the latter. In another aspect, my invention aims to provide simple and effective means for expanding a tube, such as a tubular bolt shank, to form a bulge of any desired contour; and aims to provide a method and means for this purpose which will be quick and inexpensive in operation and which will leave no obstructions within the bore of the tube. Furthermore, it aims to provide a method and means whereby such a bulge can readily be formed opposite any desired point longitudinally of the tube and whereby the bulging operation will indent the resulting bulge into material surrounding that portion of the tube so as to anchor the tube to the said surrounding material.

In an immediate commercial aspect, my invention aims to provide a method and means for the above purpose which will be particularly suited for use in connecting strips of spring shackles (such as those used on certain types of automobiles) with the bolt members of the same shackles, and aims to provide bolt members for this purpose which will be cheap in construction and which can be threaded for the attaching of suitable grease cups without requiring either difficult or expensive operations. It also aims to provide a lubricant-transmitting bolt in which the head end of the bolt shank will not be weakened by a riveting operation, and in which the boring of the shank can be performed before the latter is attached to the strap of the shackle.

Furthermore, my invention aims to provide simple means for effecting the formation of bulges in tubes and aims to include in these means cheap elements adapted to be fractured while they are being used, aims to provide an arrangement whereby the use of such fracturable elements can be continued even after the same have been fractured, and aims to provide simple means for predetermining both the diameter and the shape of contour of the resulting bulge. Still further and also more detailed objects will appear from the following specification and from the accompanying drawings, in which—

Fig. 1 is a perspective view of a spring shackle of the above mentioned type, including a pair of bolts manufactured in accordance with my invention.

Fig. 2 is an enlarged section through the bolt of Fig. 1 taken along the correspondingly numbered line in Fig. 1 and with the grease cup detached.

Fig. 3 is a partly sectioned elevation of the same bolt alone, showing the head end of the same as originally manufactured and showing the expanding washer and wedge in their starting positions.

Fig. 4 is an enlarged transverse section through Fig. 3 along the line 4—4 of that figure.

Fig. 5 is a similar section taken at the end of the expanding movement of the wedge and showing the fragments of the expanding washer as still within the tube.

Fig. 6 is a perspective view of the wedge or tapering punch used in expanding the washer.

Fig. 7 is a perspective view of the unthreaded end of the bolt shank of Fig. 3, showing the knurling desirably used on the same.

Fig. 8 is a longitudinal section of a tube having a bore of uniform diameter and showing the means employed for forming a bulge at a predetermined point in the tube in accordance with my invention.

Fig. 9 is an enlarged transverse section through a sleeve and a tube which is to be expanded into the sleeve, showing the use of a toothed washer according to my invention.

In using spring shackles of the general type consisting of two straps connected by the shanks of two bolts, it is customary to mount grease cups on the heads of these bolt shanks and to provide each shank with a bore which leads substantially to the middle of the shank and which terminates on the surface of the shank so as to feed grease to the spring which has an end looped around this shank. For this purpose, it has been customary to rivet the head end of the bolt to the adjacent strap and thereafter to drill and tap the riveted shank so as to afford the needed bores for feeding the grease and for attaching the grease cup. In practice, the riveting of a head end upon a bolt greatly weakens the latter unless the bolt is first heated, in which latter case the cost is considerably increased. Then the drilling and tapping of the already weakened head end further weakens the latter, so that the bolts as commonly employed for this purpose have been unduly subject to breakage when in use. Furthermore, the riveting has not always proven adequate for preventing a rotation of the bolt within the strap adjacent to its head end, thereby increasing the difficulty of properly attaching a nut to the other end.

In one important aspect, my invention aims to overcome all of these objections by employing a novel arrangement which will permit a stronger and more effectively anchored bolt for such uses to be manufactured at a cost even less than that of the bolts as heretofore used. For this general purpose, I initially form each bolt with a shank 1 contracted to a shorter diameter for some distance from each end, so as to leave a threaded stem 2 projecting in one direction and an unthreaded stem 3 projecting in the other direction, each of these stem portions being adjoined to the medial shank portion by a shoulder formation adapted to abut against the inner face of one of the straps 4 of the shackle. I also provide the head end stem 3 with a bore 5 of a size suitable for being threaded to fit a corresponding thread on the attaching neck of a grease cup 6, and I continue this bore 5 longitudinally of the shank by a continuation bore 7 of smaller diameter until it intersects a transverse outlet bore 8. Then I provide each of the straps 4 with perforations through which the stem parts 2 and 3 may extend, these two stem portions on each bolt being desirably of the same outside diameter so as to make all of the parts interchangeable. At the proposed head end of the bolt, the annular shoulder 9 at the rear end of the bore 5 is spaced from the shoulder 10 at the juncture of the stem 3 with the medial shank portion 1 by a distance less than the thickness of the strap 4 to which the bolt is to be anchored. Consequently, if this tubular end of the shank is inserted through one of the straps 4 from the rear face thereof after the manner of Fig. 3, the shoulder 9 will be considerably back of the forward face of the strap.

Having thus slipped the tubular stem 3 through one of the perforations in the strap, I slide into the rear end of the bore 5 a washer 11 having a bore smaller than that of the continuation bore 7. Then I expand this washer 11 by driving a tapering punch into the same towards the shoulder 9, or towards the left in Fig. 3. During this movement of the punch, the shoulder 9 prevents a movement of the washer longitudinally of the bore and hence predetermines the point at which this bore is to be expanded.

If the washer used for this purpose is of a moderately soft material, it may still bulge the tube outwardly and indent the latter to some extent into the stock outside of the tubular stem, but in that case the washer might not be fractured during the expanding. Instead it would be apt to remain anchored within the bulged portion of the tube and might interfere with the proper feeding of the grease into the bore portion 7. Moreover, any soft material would not be adequate for forming a bulge of considerable spread or of irregular contour in hard material such as the grade of steel ordinarily used for the manufacture of bolts, particularly when this bulging operation is effected without first heating the bolt shank. Hence for thick walls, I employ a washer made of hardened tool steel and I also preferably use this in a thickness which will still bring its forward face back of the front of the adjacent strap 4. In expanding such a hardened steel washer, I produce a shallow bulge before this washer is expanded beyond the limits of its elasticity, and a continuation of the expansion then fractures the washer into a considerable number of sections which extend substantially radially of the axis of the washer, somewhat after the manner shown in Fig. 5. However, since the taper of the punch 12 effectively clamps the fragments of the washer against the shoulder 9 and since the outer edges of the fragments are overhung by the curve of the bulge as soon as the bulging is started, these fragments are effectively retained in position. The continued movement of the punch therefore slides the several fragments outward radially of the axis of the washer so that each of these fragments continues to contribute its share of the bulge-producing effect. Then when the punch is withdrawn, the fragments of the washer can readily be dropped out, leaving no obstructions within the bore, after which the bore 5 can be threaded as shown in Fig. 2 to fit the stem of a grease cup.

By operating in this manner with the washer housed laterally by the stock to which the tubular portion of the stem is to be anchored, I effectively indent the resulting bulge into this stock after the manner shown in Fig. 2, and by employing hardened tool steel, I can produce this bulging and indentation to a considerable extent even if this tubular portion has a fairly thick wall. Consequently, I can obtain a strong anchoring effect and one in which the anchoring is accomplished by portions of the metal spaced from the extreme tip of the shank, so that this anchoring portion is not likely to be pulled off by undue strains after the manner of shearing off a rivet head.

Such an anchoring will be highly effective for preventing separational movement of the bolt shank and the adjacent stock longitudinally of this shank even when using a washer of cylindrical periphery and bore in cooperation with a punch having a frusto-conical operating surface. However, if the bolt shank is also to be prevented from rotating, I desirably employ one or both of two other means for anchoring the tubular shank end against such rotation. For this purpose, I may first knurl the outer surface of the tubular stem 3 with a diamond knurl, substantially as shown in Fig. 7, so that the projections formed by the knurling will dig into the adjacent portion of the strap to prevent movement of the shank with respect to the strap in any direction.

Then I may also change the contour of the indented bulge to any desired substantially polygonal shape. For example, by grinding flat longitudinal portions on the punch as shown in Fig. 6, my using such a punch even with a washer of cylindrical bore (as shown in Fig. 4) will tend to expand the washer irregularly, thereby producing the effect shown in Fig. 5, namely that of changing the contour of the bore to one substantially similar in shape to the cross-section of the punch. Owing to the non-circular cross-section thus produced in the bulge, the latter is effectively anchored against rotation within the adjacent stock, which can all be accomplished with an ordinary shape of washer by merely employing a punch of polygonal cross-section.

However, while I have heretofore described my invention as employed in the manufacture of shackle bolts of a particular type, I do not wish to be limited to this use of the method and means above described or of the fastening member thus produced. Neither do I wish to be limited to the various details of construction and arrangement thus disclosed, such as the employment of a rigid shoulder 9 within the shank.

For example, if the tube upon which the bulge is to be formed has a bore of uniform diameter, after the manner of the tube 13 of Fig. 8, I can provide the needed shoulder by inserting a smaller tube 14 from the end of the tube 13 opposite that from which the punch 12 is inserted. The inner end of this tube 14 will then afford a shoulder for preventing movement of the expansion washer 11 longitudinally of the tube 13, and by moving this inner tube 14 with respect to the outer tube, I can readily produce the proposed bulge at any desired point in this outer tube.

Moreover, my invention may be employed equally well regardless of the nature of the stock into which the proposed bulge formation is to be indented. For example, if a tube 15 is to be anchored to a sleeve 16 slipped over the same, I can accomplish this after the manner of my invention by using a washer 17 having outwardly projecting teeth 18 as shown in Fig. 9. In this case, the expansion of the washer 17 will primarily force the teeth 18 into the tube 15, thereby correspondingly indenting this tube into the bore of the sleeve 16, so that I can anchor a tube to a sleeve in this manner without marring the exterior of the sleeve.

In practice, the thickness of the expanding washers used in carrying out my invention may be varied considerably, thereby correspondingly varying the size of the bulge longitudinally of the tube. The bore of the washer may also be varied in shape, though I have found the expanding operation to be accomplished most easily if the washer has a bore corresponding approximately in taper to that of the punch.

So also, the hardness of the washer may be varied according to circumstances, as for example by using a softer washer and leaving this within the bulge to reinforce a thin wall.

I claim as my invention:—

1. The method of expanding a non-terminal portion of a tube, which consists in inserting a frangible annular member of smaller bore within the said portion of the tube and expanding the annular member while thus disposed so as to enlarge the contour of the said member beyond the normal bore of the said tube portion.

2. The method of expanding a non-terminal portion of a tube, which consists in inserting a frangible annular member of smaller bore within the said portion of the tube, expanding the annular member while thus disposed to indent the same into the tube, and continuing the expansion of the annular member after the annular member is ruptured by the applied force so as to cause the constituent portions of the said member to continue the expansion of the tube.

3. The method of forming an annular bulge of predetermined bore in a tube which consists in disposing a frangible annular member within the portion of the tube on which the bulge is to be formed and expanding the annular member in various directions radially thereof to an extent proportioned to the corresponding radial measurements of the proposed bore.

4. The method of forming an annular bulge in a tube which consists in disposing an annular member within the portion of the tube on which the bulge is to be formed, radially expanding the annular member until the annular member is fractured, and thereafter removing the fragments of the said member.

5. The method of forming annular bulge in a tube which consists in disposing a frangible washer within the tube in alinement with the proposed bulge transversely of the tube, holding the washer against movement in one direction longitudinally of the tube and expanding the washer while so held by the driving of a tapering wedge into the bore of the washer in the same direction.

6. The method of anchoring a tube to stock through which it slidably extends, which consists in disposing an annular member within the part of the tube housed by the stock and coaxial with the tube, and expanding the said member to a varying degree along different radii to form a bulge of non-circular periphery indented into the stock.

7. The method of anchoring a tube to stock through which it slidably extends, which consists in disposing an annular member within the part of the tube housed by the stock and coaxial with the tube, and driving into the bore of the said annular member a wedge having a cross-section different in shape from that of the said bore.

8. The method of anchoring a tube to stock through which it slidably extends, which consists in disposing within the part of the tube housed by the stock an annular member having a bore of circular cross-section, and driving into the said bore a wedge of substantially polygonal cross-section.

9. The method of anchoring a tube to stock through which it slidably extends, which consists in disposing an annular member within the part of the tube housed by the stock, expanding the said member to form a bulge on the tube indented into the stock, continuing the expansive movement after the said member has been ruptured into fragments by the expansive strain thereon so as to increase the said bulge and the indenting, and thereafter removing the said fragments from the tube.

Signed at Chicago, Illinois, February 27th, 1922.

JOSEF BRANDSTETTER.